United States

Carlyle

[11] 3,838,565
[45] Oct. 1, 1974

[54] LIQUID CRYSTAL DISPLAY UTILIZING AMBIENT LIGHT FOR INCREASED CONTRAST

[75] Inventor: James S. Carlyle, Santa Clara, Calif.

[73] Assignee: American Micro-Systems, Incorporated, Santa Clara, Calif.

[22] Filed: June 21, 1973

[21] Appl. No.: 372,166

[52] U.S. Cl............ 58/50 R, 58/127 R, 350/160 LC
[51] Int. Cl..................... G04b 19/30, G04b 19/06
[58] Field of Search...... 58/50 R, 127 R; 350/150 R, 350/160 LC

[56] References Cited
UNITED STATES PATENTS

| | | | |
|---|---|---|---|
| 3,503,670 | 3/1970 | Kosanke et al. | 350/160 LC X |
| 3,505,804 | 4/1970 | Hofstein | 58/23 |
| 3,597,043 | 8/1971 | Dreyer | 350/160 LC X |
| 3,651,634 | 3/1972 | Cooper | 58/50 R |
| 3,728,007 | 4/1973 | Myrenne et al. | 350/160 LC |
| 3,738,942 | 6/1973 | Matsumoto et al. | 350/160 LC X |

*Primary Examiner*—Edith Simmons Jackmon
*Attorney, Agent, or Firm*—Owen, Wickersham & Erickson

[57] ABSTRACT

A readout display for use in combination with an electronic clock, calculator or electrical instrument utilizes a prism for receiving ambient light or light from a distant source and directing it through a louvered light film to back light and enhance the contrast characteristics of a liquid crystal display package. The latter is edge mounted in a base assembly including a printed circuit board for a display driver circuit and a power supply.

8 Claims, 7 Drawing Figures

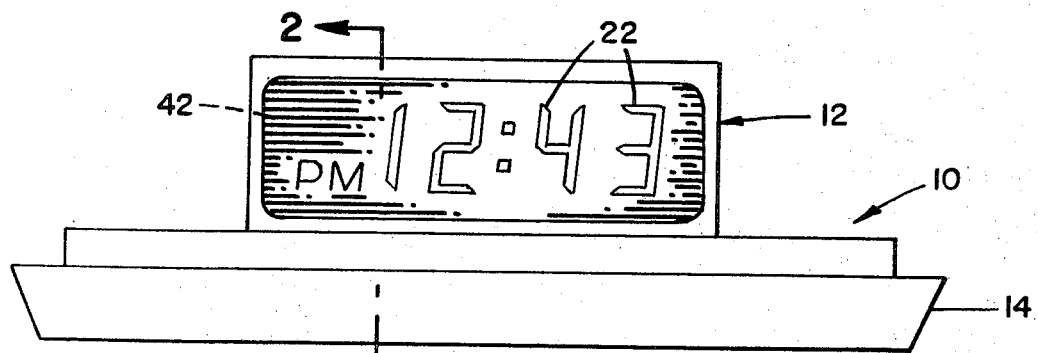
FIG_1
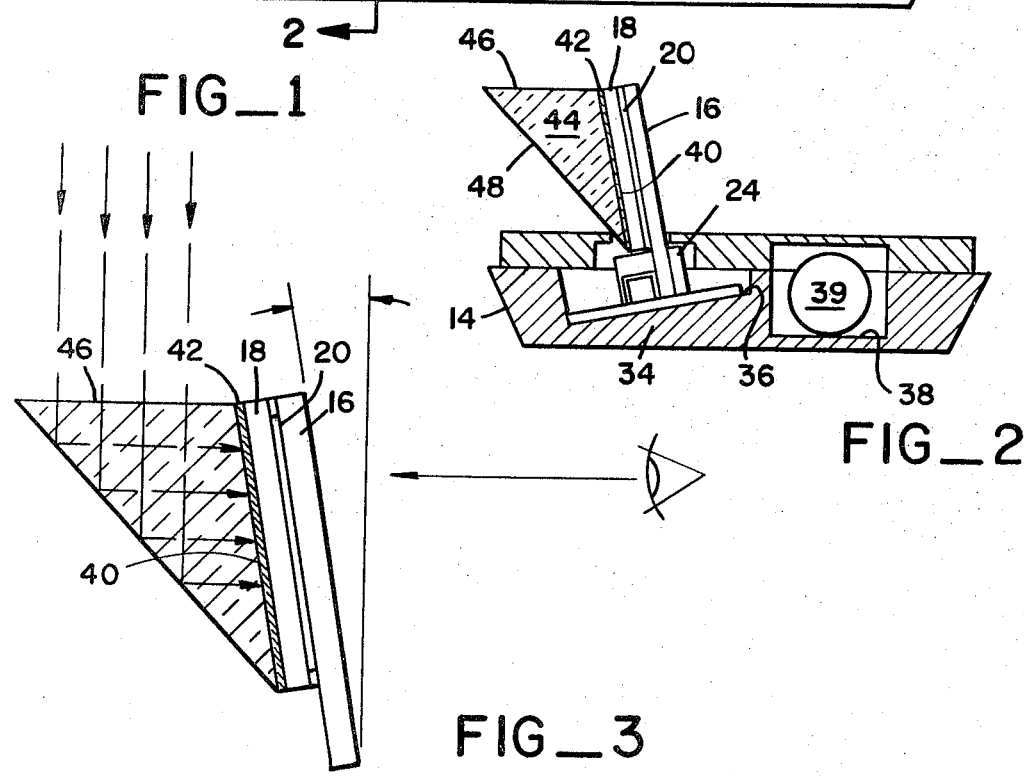
FIG_2
FIG_3
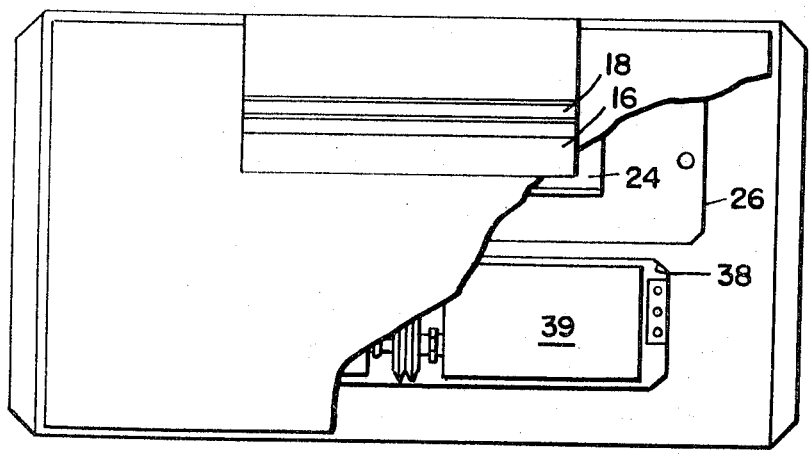
FIG_4

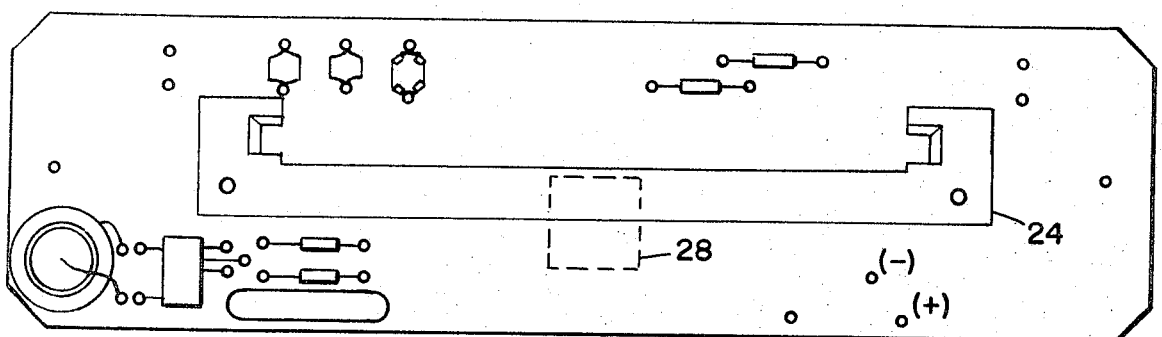
FIG_5
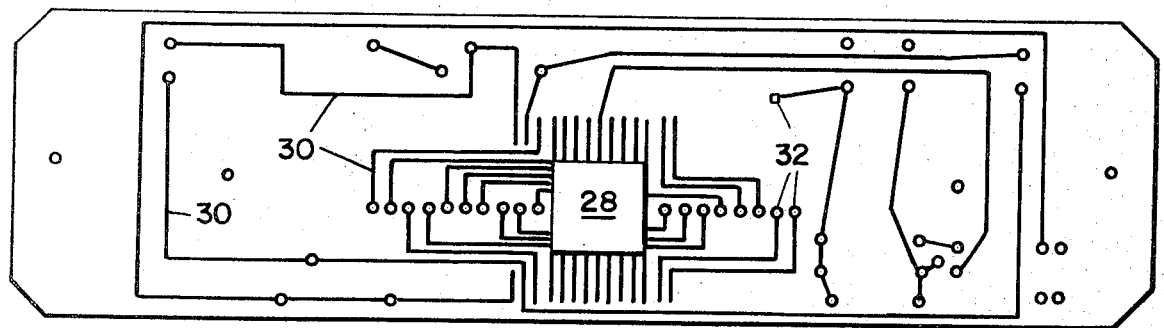
FIG_6
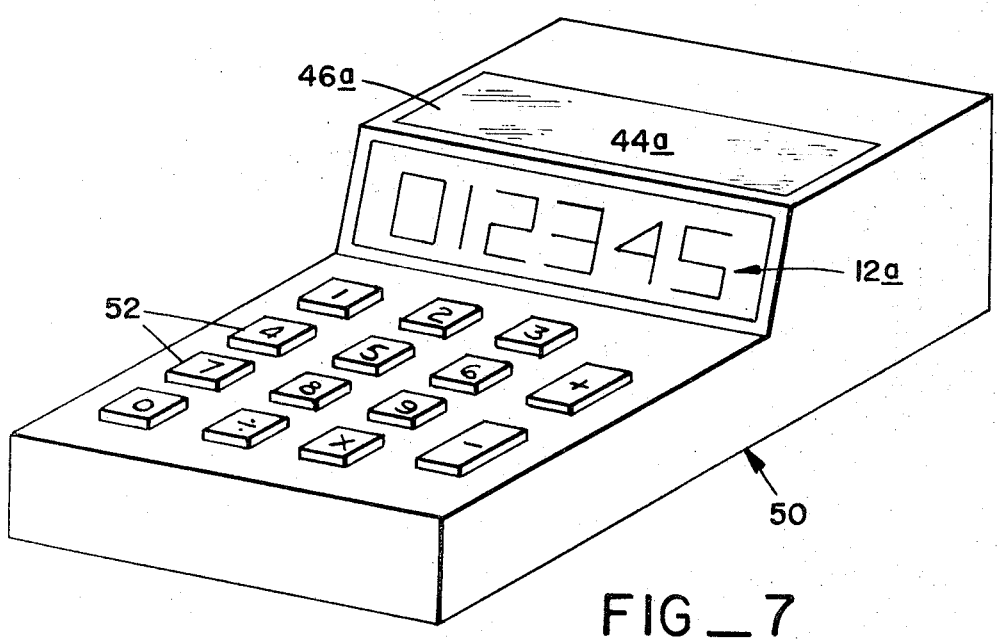
FIG_7

3,838,565

LIQUID CRYSTAL DISPLAY UTILIZING AMBIENT LIGHT FOR INCREASED CONTRAST

This invention relates to display devices such as digital displays for electronic clocks, calculators or instruments requiring digital readouts, such as voltmeters and the like. More specifically, it relates to a liquid crystal display device that utilizes light from an external source for enhancing contrast characteristics.

BACKGROUND OF THE INVENTION

Although liquid crystal displays reached an acceptable level of development for use as digital readout devices prior to the present invention, they long had the inherent problem of lack of brightness as well as contrast between the display figures and the surrounding background. Previous attempts to overcome this problem included the use of various backlighting systems such as battery operated internally mounted lamps, utilized with various reflective elements. Such systems were often unsatisfactory because they require a separate power source, thereby making the display more complicated and costly to manufacture. Those working in the field sought to provide the necessary backlighting and contrast in a liquid crystal display while also eliminating the need for any auxiliary power. It is therefore a general object of the present invention to provide a display device that solves this problem and provides increased brightness and contrast without internal lighting provided by auxiliary power.

Another object of the present invention is to provide a liquid crystal display particularly adaptable for table clocks that utilizes ambient overhead lighting to provide increased brightness and contrast in the display.

Other objects of the present invention are to provide a unique combination of a liquid crystal display and electronic clock circuitry that provides a particularly bright and easily readable display; that is readily mounted in an eye-pleasing manner; and that is well adapted for ease and economy of manufacture.

SUMMARY OF THE INVENTION

In broad terms, a display device according to the principles of the present invention comprises a liquid crystal package having a pair of spaced apart glass plates which are sealed around the edges thereof to form a planar cavity filled with a liquid crystal material. Conductive layers are formed on the inside surfaces of the glass plates, one being formed in a predetermined segmented pattern such as a group of seven digital characters, with each of the segments having a conductive lead portion extending from it. The conductive layer on the other plate is shaped to form an electrical ground area directly in line with the conductive segments on the opposite plate and suitable lead connections from these ground area that extend downwardly. Attached to the outside surface of the rearwardly oriented glass plate with respect to the viewer's eye is a layer of light directing material having parallel internal light directing louvers. Fixed to the light directing material at one of its faces is a triangular prism having an upper face that is substantially horizontal. Thus, ambient light falling on the upper face of the prism is reflected through it toward its other face attached to the liquid crystal package. The reflected light passes through the louvered light directing material to enhance the brightness of the display. Yet the louvers of the light directing material provide a darkened background to the viewer in areas not having any active display character segments. The overall effect is a display with considerable brightness to the active segments while having a distinct contrast with the background, thereby making it highly readable while avoiding the need for auxiliary light sources.

The display package with its prism is edge mounted on a connector receptacle fixed to a printed circuit board on which are mounted the other electronic components of the clock, calculator or device providing the main electrical functions for the display. The board and other components of the device including the power supply are mounted within a suitable housing.

Other objects, advantages and features of the invention will become apparent from the following detailed description presented with the accompanying drawings.

DESCRIPTION OF THE DRAWINGS

FIG. 1 is a view in elevation of a digital clock with a display embodying the principles of the present invention;

FIG. 2 is a view in section taken along the line 2—2 of FIG. 1;

FIG. 3 is an enlarged view in cross section showing the liquid crystal display and attached prism for the device of FIG. 1;

FIG. 4 is a top view of FIG. 1 with portions of the clock base broken away;

FIG. 5 is an enlarged top plan view of a typical printed circuit board and display receptacle connector for the clock of FIGS. 1 - 4;

FIG. 6 is an enlarged bottom view of the circuit board of FIG. 5; and

FIG. 7 is a view in perspective of a calculator utilizing a display unit according to the present invention.

DESCRIPTION OF EMBODIMENTS

With reference to the drawing FIG. 1 shows a digital clock 10 having a display unit 12 which, according to the principles of the present invention, utilizes ambient light to increase the brightness and contrast of the display. Although the display shown here is combined with a clock, its unique features may be applied with equal effectiveness to displays for other types of devices requiring a readout indicator, such as calculators, meters and other types of instruments or devices. In this embodiment, the display unit 12 extends upwardly from a wider and larger base unit 14 for the clock that contains its driver circuitry and power supply.

The display unit 12 as shown in FIGS. 2 and 3 has a front plate 16 and a rear plate 18 of glass that are spaced apart and sealed around their edges to form an internal cavity which is filled with a suitable nematic liquid crystal material 20. As with conventional liquid crystal display devices, the inner surfaces of the two plates 16 and 18 are both coated with a conductive material such as tin oxide. The layer on one plate is formed in a predetermined pattern of segmented master characters 22 and the conductive layer on the inside surface of the opposite plate has larger areas forming an electrical ground. Thus, when current flows between any given conductive segment and its opposite ground area the liquid crystal material between these two conductive layers will react to cause an orientation of the liquid molecules that provides a visual change compared with its inactive surrounding material.

In accordance with the embodiment of my invention in FIGS. 1 – 6, the lower end of the front plate 16 on the display unit 12 is somewhat longer than the rear plate 18 and slidably fits into an edge mounting connector receptacle 24 so that lead members from the character segments which terminate along the lower edge of the front plate will contact a series of terminals spaced apart on the connector. As shown in FIG. 5, this receptacle is mounted on a small printed circuit board 26 to which are attached the other components of the electronic circuitry of the device. The arrangement, number and location of these various components may vary depending on the device for which the display is to be used. For example, the circuit board shown in FIGS. 5 and 6 is particularly adapted for the digital clock of FIG. 1. Since the electronic circuitry itself is not an essential part of this invention and could take various forms, it will not be described in detail. Suffice it to say that the components in the case of a digital clock may include semiconductor driver circuit 28 and the various resistors, capacitors, connectors and other necessary elements in addition to a connection for a suitable power source. FIG. 6 shows the underside of the printed circuit board with the various conductor paths 30 and terminals 32 for interconnecting the circuit components.

As shown in FIG. 2, the printed circuit board 26 is conveniently retained within a recess 34 formed in the base unit 14 and is preferably supported therein on a ledge 36 of the recess so that it is maintained at a slight angle (e.g. 10°) to the horizontal. This causes the display unit 12 to tilt rearwardly at the same angle with respect to a vertical plane. Another recess 38 within the base unit provides room for one or more batteries 39 or for an extension cord that can be removed and plugged into a standard outlet to provide power for the clock.

Although one particularly efficient arrangement for connecting the display unit 12 to the printed circuit board 26 using the receptacle 24 has been shown, other means for interconnecting the display unit to electronic components could be used within the scope of the invention.

Now, bonded to the outer surface of the rear plate 18 to the display unit 12 is a layer of louvered light transmitting material 40. This material is essentially a plastic film of uniform thickness which has a series of parallel, evenly spaced apart microlouvers 42 uniformly implanted throughout the film and all being tilted at some predetermined angle with respect to the opposite planar surfaces of the material. Such louvered film material is available commercially from the 3M Company. As shown in FIG. 3, these louvers of a thin opaque material are generally horizontal and are oriented at a predetermined angle (e.g. around 30°) with respect to the surface of the film 40. They are spaced apart so that when viewed directly along a line perpendicular to the film, only the opaque louvers are seen. Yet light can pass between the louvers at their internally oriented angle.

Fixed to the outer surface of the louvered material 40, as by a clear bonding material, is an optical prims 44 of some clear glass or plastic material. The top surface 46 of the prism is essentially horizontal and flush with the upper edges of the front and rear plates 16 and 18 of the display unit. The angular back surface 48 of the prism slopes downwardly and inwardly to the bottom edge of the rear plate 16. As seen in FIG. 3, light directed downwardly from a source above the clock 10, as when it is sitting on a desk in a ceiling lighted room, strikes the prism surface 46 and is reflected within the prism from its back surface 48. The reflected light is directed substantially horizontally through the plastic film 40 between the louvers 42. When the liquid crystal unit is activated, the portion of reflected light that is reflected through the prism and passes between the louvers of the plastic film enhances the brightness of the activated character segments of the display unit. At the same time, the microlouvers 42 when viewed by a person substantially in front of the display unit 12 tend to darken the background surrounding the activated character segments 22. The result is an increased brightness of the liquid crystal activated character segments combined with a greater contrast with the darkened surrounding area caused by the louver material.

Although the brightness and contrast enhancing feature of the present invention is particularly well adapted for a digital clock display, as described, it may be utilized on other liquid crystal displays in much the same manner. For example, in FIG. 7, a display 12a is shown in combination with an electronic calculator 50. Here, the front plate of the display is arranged so that it is substantially vertical and is located rearward of a keyboard 52. A prism 44a attached to the display in the same manner as previously described, has a top horizontal surface 46a that is flush with the calculator housing. The function of the prism here is identical to that in the previous digital clock embodiment. Light coming from above the calculator strikes the prism and is reflected horizontally through the rear of the display package.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An electronic digital clock display comprising:
a base unit forming a housing with a cavity;
electrical circuit means located within said cavity;
a liquid crystal display unit connected to said circuit means and extending upwardly from said base unit, said display unit including (a) a pair of spaced apart front and rear glass plates forming a planar cavity filled with nematic liquid crystal material, (b) a transparent film bonded to the outer surface of said rear plate having internal spaced apart louvers tilted downwardly within said film toward said rear plate, and (c) an optical prism having a first surface fixed to said film and a second surface forming an angle with said first surface for receiving ambient light that is reflected internally by the prism and directed toward said rear plate.

2. The digital clock display as described in claim 1 wherein said front plate of said display unit is longer than said rear plate and is edge mounted on and connected to said circuit means.

3. The digital clock display as described in claim 1 wherein said front plate of said display unit is substantially vertical and said second surface of said prism is substantially parallel to the bottom of said base unit.

4. The digital clock display as described in claim 1 wherein said circuit means comprises an elongated circuit board having a receptacle connector for receiving the lower edge of said front plate of said display unit and other electrical components for operating said clock display; and battery power means in said base unit connected to said circuit board.

5. A digital clock display as set forth in claim 1 wherein said transparent film layer is a plastic material with spaced apart microlouvers that are tilted downwardly toward said rear plate at an angle of about 30°.

6. A digital clock display as set forth in claim 2 wherein said transparent film layer is a plastic material with spaced apart microlouvers that are tilted downwardly toward said rear plate at an angle of about 30°.

7. A digital clock display as set forth in claim 3 wherein said transparent film layer is a plastic material with spaced apart microlouvers that are tilted downwardly toward said rear plate at an angle of about 30°.

8. A digital clock display as set forth in claim 4 wherein said transparent film layer is a plastic material with spaced apart microlouvers that are tilted downwardly toward said rear plate at an angle of about 30°.

* * * * *